US010662365B2

(12) United States Patent
Dino et al.

(10) Patent No.: US 10,662,365 B2
(45) Date of Patent: May 26, 2020

(54) OIL BASED DRILLING FLUIDS USEFUL HAVING REDUCED CHANGE IN HIGH SHEAR VISCOSITY OVER A WIDE TEMPERATURE RANGE

(71) Applicant: Elementis Specialties, Inc., East Windsor, NJ (US)

(72) Inventors: David Dino, Cranbury, NJ (US); Gabriela Barbara Ber, Asbury Park, NJ (US); Wouter Ijdo, Yardley, PA (US); Edward Magauran, Westampton, NJ (US); Jeffrey Thompson, Hightstown, NJ (US)

(73) Assignee: Elementis Specialties, Inc., East Windsor, NJ (US)

( * ) Notice: Subject to any disclaimer, the term of this patent is extended or adjusted under 35 U.S.C. 154(b) by 0 days.

(21) Appl. No.: 16/001,290

(22) Filed: Jun. 6, 2018

(65) Prior Publication Data
US 2019/0375976 A1    Dec. 12, 2019

(51) Int. Cl.
*C09K 8/36*    (2006.01)

(52) U.S. Cl.
CPC ..................................... *C09K 8/36* (2013.01)

(58) Field of Classification Search
CPC ...................................................... C09K 8/36
See application file for complete search history.

(56) References Cited

U.S. PATENT DOCUMENTS

| | | | |
|---|---|---|---|
| 4,434,076 A | 2/1984 | Mardis et al. | |
| 4,464,274 A * | 8/1984 | House | C01B 33/44 507/128 |
| 4,469,639 A | 9/1984 | Thompson, III et al. | |
| 4,508,628 A * | 4/1985 | Walker | C09K 8/36 507/129 |
| 4,517,112 A | 5/1985 | Mardis et al. | |
| 4,664,820 A | 5/1987 | Magauran et al. | |
| 5,075,033 A | 12/1991 | Cody et al. | |
| 5,336,647 A | 8/1994 | Nae et al. | |
| 5,576,257 A | 11/1996 | Jordan | |
| 5,718,841 A | 2/1998 | Mardis et al. | |
| 5,780,376 A | 4/1998 | Gonzales et al. | |
| 6,130,256 A | 10/2000 | Nae | |
| 6,172,121 B1 | 1/2001 | Chaiko | |
| 6,187,719 B1 * | 2/2001 | Dino | C01B 33/44 507/129 |
| 6,462,096 B1 | 10/2002 | Dino et al. | |
| 6,787,592 B1 | 9/2004 | Powell et al. | |
| 7,462,580 B2 | 12/2008 | Kirsner et al. | |
| 7,939,470 B1 | 5/2011 | Wagle et al. | |
| 7,989,402 B2 | 8/2011 | Dino et al. | |
| 8,476,201 B2 | 7/2013 | Miller et al. | |
| 8,569,213 B2 | 10/2013 | Miller et al. | |
| 9,611,417 B2 | 4/2017 | Wagle et al. | |
| 2017/0051193 A1 | 2/2017 | Dino et al. | |

FOREIGN PATENT DOCUMENTS

EP    1356010 B1    6/2010

OTHER PUBLICATIONS

Del Olmo et al., "Alkyl substituent effect on density, viscosity and chemical behavior of 1-alkyl-3-methylimidazolium chloride", J Mol Model, vol. 20, No. 2392 (2014).
Karna et al., "Preparation and characterization of new low melting ammonium-based ionic liquids with ether functionality", Journal of Molecular Structure, vol. 922, pp. 64-76 (2009).
Rosa et al., "Influence of particle size on the melting characteristics of organic compounds", J. Therm. Anal Calorim, vol. 120, pp. 783-787 (2015).
International Search Report and Written Opinion for corresponding application PCT/US2019/033337 dated Aug. 2, 2019, 9 pages.

* cited by examiner

*Primary Examiner* — Alicia Bland
(74) *Attorney, Agent, or Firm* — Morgan, Lewis & Bockius LLP

(57) ABSTRACT

An oil-based drilling fluid and a method for maintaining viscosity of an oil-based drilling fluid over a temperature range of about 120° F. to about 40° F. The oil-based drilling fluid comprises a quaternary ammonium ion having a corresponding quaternary ammonium salt having a neat shear strength value less than 6000 lb/100 ft$^2$. The organoclay drilling fluid additive imparts a first high shear viscosity to the oil-based drilling fluid at temperatures of 40° F. or less and imparts a second high shear viscosity to the oil-based drilling fluid at temperatures greater than or equal to 120°, wherein the difference between the first high shear viscosity and the second high shear viscosity is less than 110%. The organoclay drilling fluid additive, further imparts a first low shear viscosity to the oil-based drilling fluid at temperatures of 40° F. or less and imparts a second low shear viscosity to the oil-based drilling fluid at temperatures greater than or equal to 120° F., wherein the difference between the first low shear viscosity and the second low shear viscosity is less than 50%. The quaternary ammonium salt may be selected from dimethyl dicoco ammonium salt; dimethyl dicoco ammonium chloride; dimethyl didecyl ammonium salt; dimethyl didecyl ammonium chloride and combinations thereof.

4 Claims, No Drawings

OIL BASED DRILLING FLUIDS USEFUL HAVING REDUCED CHANGE IN HIGH SHEAR VISCOSITY OVER A WIDE TEMPERATURE RANGE

FIELD OF THE INVENTION

The present invention relates to an oil-based drilling fluid, and its method of use, containing an organoclay composition wherein a phyllosilicate clay is exchanged with a quaternary ammonium ion with a corresponding quaternary ammonium salt having neat shear strength value less than 6000 lb/100 ft$^2$.

BACKGROUND OF THE INVENTION

Drilling fluids have been used since the very beginning of oil well drilling operations in the United States and drilling fluids and their chemistry are an important area for scientific and chemical investigations. Certain uses and desired properties of drilling fluids are reviewed in U.S. Patent Application 2004/0110642 and 2009/0227478 and U.S. Pat. Nos. 7,345,010, 6,339,048 and 6,462,096, issued to the assignee of this application, the entire disclosures of which are incorporated herein by reference.

Nevertheless, the demands of the oil-well drilling environment require increasing improvements in rheology control over broad temperature ranges. This becomes particularly true, for example, as the search for new sources of oil involves greater need to explore in deep water areas and to employ horizontal drilling techniques.

SUMMARY OF THE INVENTION

In certain embodiments, the present invention provides oil-based drilling fluid, and its method of use.

One embodiment provides for a method for maintaining viscosity of an oil-based drilling fluid over a temperature range of about 120° F. to about 40° F. The method comprises the step of adding a organoclay drilling fluid additive to a base oil to form an oil based drilling fluid, wherein the organoclay drilling fluid additive comprises a phyllosilicate clay and a quaternary ammonium ion, wherein a corresponding quaternary ammonium salt has a neat shear strength value less than 6000 lb/100 ft$^2$ such that said organoclay drilling fluid additive imparts a first high shear viscosity to the oil-based drilling fluid at temperatures of 40° F. or less and imparts a second high shear viscosity to the oil-based drilling fluid at temperatures greater than or equal to 120° F. The difference between the first high shear viscosity and the second high shear viscosity is less than 110%, when the first high shear viscosity is measured at 600 rpm using a FANN viscometer at 40° F. and the second high shear viscosity is measured at 600 rpm using a FANN viscometer at 120° F. In some embodiments, the method further includes the step of placing the drilling fluid in a subterranean formation via a wellbore penetrating the subterranean formation.

Another embodiment provides for an oil-based drilling fluid comprising a quaternary ammonium ion having a corresponding quaternary ammonium salt having a neat shear strength value less than 6000 lb/100 ft$^2$. In some embodiments, the corresponding quaternary ammonium salt has a neat shear strength value ranging from 2000 lb/100 ft$^2$ to 6000 lb/100 ft$^2$. In the foregoing embodiments, the organoclay drilling fluid additive imparts a first high shear viscosity to the oil-based drilling fluid at temperatures of 40° F. or less and imparts a second high shear viscosity to the oil-based drilling fluid at temperatures greater than or equal to 120°, wherein the difference between the first high shear viscosity and the second high shear viscosity is less than 110%, when the first high shear viscosity is measured at 600 rpm using a FANN viscometer at 40° F. and the second high shear viscosity is measured at 600 rpm using a FANN viscometer at 120° F. In further of the foregoing embodiments, the organoclay drilling fluid additive imparts a first low shear viscosity to the oil-based drilling fluid at temperatures of 40° F. or less and imparts a second low shear viscosity to the oil-based drilling fluid at temperatures greater than or equal to 120° F., wherein the difference between the first low shear viscosity and the second low shear viscosity is less than 50%, when the first low shear viscosity is measured at 6 rpm using a FANN viscometer at 40° F. and the second low shear viscosity is measured at 6 rpm using a FANN viscometer at 120° F. In one embodiment, the quaternary ammonium salt is selected from dimethyl dicoco ammonium salt; dimethyl dicoco ammonium chloride; dimethyl didecyl ammonium salt; dimethyl didecyl ammonium chloride and combinations thereof.

In one embodiment, the present disclosure provides for an oil-based drilling fluid comprising: an invert emulsion drilling fluid; an organoclay drilling fluid additive comprising a phyllosilicate clay and a quaternary ammonium ion, wherein the quaternary ammonium ion has a corresponding quaternary ammonium salt having a neat shear strength value less than 6000 lb/100 ft$^2$; and one or more additives selected from the group consisting of: brine, a fluid loss reducing additive; an emulsifier; a weighting agent, rheology modifiers and combinations thereof. In one embodiment, the corresponding quaternary ammonium salt is selected from dimethyl dicoco ammonium chloride; dimethyl didecyl ammonium chloride; and combinations thereof.

DETAILED DESCRIPTION OF THE EMBODIMENTS

In one embodiment, the present invention provides oil-based drilling fluid, and its method of use. The oil based drilling fluid contains an invert emulsion drilling fluid and an organoclay drilling fluid additive which can be used in drilling applications where there is a temperature difference between the riser and the annulus such as deep well drilling or drilling applications in cold climates.

In one embodiment, the present disclosure provides for an oil-based drilling fluid comprising: an invert emulsion drilling fluid; an organoclay drilling fluid additive comprising a phyllosilicate clay and a quaternary ammonium ion, wherein the quaternary ammonium ion has a corresponding quaternary ammonium salt having a neat shear strength value less than 6000 lb/100 ft$^2$; and one or more additives selected from the group consisting of: brine, a fluid loss reducing additive; an emulsifier; a weighting agent, rheology modifiers and combinations thereof. In some such embodiments, the corresponding quaternary ammonium salt has a neat shear strength value ranging from 2000 lb/100 ft$^2$ to 6000 lb/100 ft$^2$. For the purposes of this application, the term "neat shear strength" means the shear strength was measured on a quaternary ammonium salt in the absence of solvent.

In certain embodiments of the oil-based drilling fluid, the invert emulsion drilling fluid has an external phase selected from the group consisting of: diesel oil, mineral oil, synthetic oil, vegetable oil, fish oil, paraffinics, ester-based oils and combinations thereof. In one embodiment, the quaternary ammonium salt is selected from dimethyl dicoco ammonium salt; dimethyl dicoco ammonium chloride; dimethyl didecyl ammonium salt; dimethyl didecyl ammonium chloride; and combinations thereof. In one embodiment, the organoclay drilling fluid additive has a concentration, in the oil based drilling fluid, ranging from 2 ppb to about 15 ppb. In an additional embodiment, the oil-based drilling fluid is substantially free of a polyamide drilling fluid additive.

In another embodiment, the present disclosure provides for a method for maintaining viscosity of an oil-based drilling fluid over a temperature range of about 120° F. to about 40° F. The method comprises the step of adding a organoclay drilling fluid additive to a base oil to form an oil based drilling fluid, wherein the organoclay drilling fluid additive comprises a phyllosilicate clay and a quaternary ammonium ion, wherein a corresponding quaternary ammonium salt has a neat shear strength value less than 6000 lb/100 ft$^2$ such that said organoclay drilling fluid additive imparts a first high shear viscosity to the oil-based drilling fluid at temperatures of 40° F. or less and imparts a second high shear viscosity to the oil-based drilling fluid at temperatures greater than or equal to 120° F.

In an embodiment of the oil based drilling fluid and the method for maintaining viscosity of the oil-based drilling fluid, the oil based drilling fluid has a first high shear viscosity at temperatures of 40° F. or less and the oil-based drilling fluid has a second high shear viscosity at temperatures greater than or equal to 120° F., such that the difference between the first high shear viscosity and the second high shear viscosity is less than about 90%, when the first high shear viscosity is measured at 600 rpm using a FANN viscometer at 40° F. and the second high shear viscosity is measured at 600 rpm using a FANN viscometer at 120° F. In another such embodiment, the difference between the first high shear viscosity and the second high shear viscosity is less than about 70%, when the first high shear viscosity is measured at 600 rpm using a FANN viscometer at 40° F. and the second high shear viscosity is measured at 600 rpm using a FANN viscometer at 120° F. In yet another such embodiment, the difference between the first high shear viscosity and the second high shear viscosity is less than about 50%, when the first high shear viscosity is measured at 600 rpm using a FANN viscometer at 40° F. and the second high shear viscosity is measured at 600 rpm using a FANN viscometer at 120° F.

In another embodiment of the oil based drilling fluid and the method for maintaining viscosity of the oil-based drilling fluid, the oil based drilling fluid has a first low shear viscosity at temperatures of 40° F. or less and a second low shear viscosity at temperatures greater than or equal to 120° F., wherein the difference between the first low shear viscosity and the second low shear viscosity is less than about 50%, when the first low shear viscosity is measured at 6 rpm using a FANN viscometer at 40° F. and the second low shear viscosity is measured at 6 rpm using a FANN viscometer at 120° F. In another such embodiment, the difference between the first low shear viscosity and the second low shear viscosity is less than about 25%, when the first low shear viscosity is measured at 6 rpm using a FANN viscometer at 40° F. and the second low shear viscosity is measured at 6 rpm using a FANN viscometer at 120° F. In still another such embodiment, the difference between the first low shear viscosity and the second low shear viscosity is less than about 10%, when the first low shear viscosity is measured at 6 rpm using a FANN viscometer at 40° F. and the second low shear viscosity is measured at 6 rpm using a FANN viscometer at 120° F.

Organoclay Drilling Fluid Additive

The present disclosure provides for embodiments of an oil-based drilling fluid and methods for maintaining viscosity of the oil-based drilling fluid wherein the oil-based drilling fluid contains an organoclay drilling fluid additive comprising a phyllosilicate clay and a quaternary ammonium ion. Various embodiments of such organoclay drilling fluid additive are described below. For such embodiments, the oil based drilling fluids may contain about 2 pounds to about 15 pounds of the organoclay drilling fluid additive per barrel of fluids. In other embodiments, oil based drilling fluids may contain about 2 pounds to about 10 pounds of the drilling fluid additive per barrel of fluids, and in still other embodiments, oil based drilling fluids may contain about 2 pounds to about 5 pounds of the drilling fluid additive per-barrel of fluids. For the purposes of this application, the abbreviation "ppb" corresponds to pound per barrel of fluid.

In one embodiment, the organoclay drilling fluid additive contains a quaternary ammonium ion having a quaternary ammonium salt with a neat shear strength value less than 6000 lb/100 ft$^2$ or less than 5500 lb/100 ft$^2$ or less than 5000 lb/100 ft$^2$. In some such embodiments, the neat shear strength value ranges from 2000 lb/100 ft$^2$ to 6000 lb/100 ft$^2$; 3000 lb/100 ft$^2$ to 5000 lb/100 ft$^2$; or 3500 lb/100 ft$^2$ to 5000 lb/100 ft$^2$.

As used herein, the neat shear strength of a quaternary ammonium salt is measured as follows in accordance with API RP 13B-1. The quaternary ammonium salt, without solvent, is placed in a container and a metal shear tube 3.5 inches (89 mm) in length, with an outside diameter of 1.4 inches (36 mm) and wall thickness of 0.008 inches (0.02 mm), is placed onto the surface of the quaternary ammonium salt. A platform or "stage" is then placed directly on top of the metal shear tube. Incremental amounts of a known weight are sequentially placed on the platform until the metal shear tube is submerged approximately 2 inches into the surface of the quaternary ammonium salt. The depth submerged is then accurately measured and recorded along with the combined weight of the platform and the incrementally added weights. When inches, grams, gallons, and pounds are the units employed, the following equation can be utilized to calculate the neat shear strength:

$$S = \frac{3.61(Z+W)}{L} - 0.256A$$

where S=shear strength in lb/100 ft$^2$, Z=weight of shear tube in grams, W=total shear weight in grams (tube+platform+incrementally added weights), L=submerged depth of shear tube in inches, and A is the quaternary ammonium salt density in lb/gal.

In one embodiment of the organoclay drilling fluid additive, the quaternary ammonium salt is selected from dimethyl dicoco ammonium salt; dimethyl dicoco ammonium chloride; dimethyl didecyl ammonium salt; dimethyl didecyl ammonium chloride and combinations thereof.

Phyllosilicate clay is ion exchanged with the above various embodiments of quaternary ammonium ions/salts to form the organoclay drilling fluid additive. The phyllosilicate clay includes natural or synthetic phyllosilicate clay, or mixtures thereof, which undergo ion exchange reactions with quaternary ammonium cations forming an organoclay. Representative natural phyllosilicate clays include smectites, palygorskite, sepiolite, vermiculites, and micas. Examples of smectite-type clays include montmorillonite, bentonite, hectorite, saponite, stevensite, and beidellite. In some embodiments, the phyllosilicate clay includes swelling clays such as hectorite and Wyoming-type bentonite. In some embodiments, the phyllosilicate clay is a mixture of hectorite and bentonite. Bentonite and its properties are described at length in the chapter entitled "Bentonite," in Carr, D., ed. 1994, Industrial Minerals and Rocks, 6th Edition (published by the Society For Mining, Metallurgy and Exploration, Colorado). Smectite-type clays are well known in the art and are commercially available from a variety of sources. Phyllosilicate clays useful in accordance with the present invention are described in detail in "Hydrous Phyllosilicates, Reviews in Mineralogy, Volume 19, S. W. Bailey, editor." Other useful literature can be found in Elsevier book series entitled "Developments in Clay Science", in particular Volume 5 entitled "Handbook of Clay Science."

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or an anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Smectite clays are layered, platy, hydrophilic silicate materials. In the dry state, several nano-sized clay layers are normally stacked on top of each other and these stacks, or tactoids, are agglomerated into particles. However, the platelets spontaneously separate from each other when dry clay powder is dispersed in water. This "delamination of layers" is at times also referred to as "exfoliation of layers." Smectite clay layers carry a net negative charge on the platelets that is neutralized by metal cations that are positioned on the surfaces of the platelets. An organoclay is formed when the metal cations are exchanged with organic cations. This reaction may be partially completed or driven to completion. Organic surface treatment is often necessary to improve the compatibility of the clay with organic systems. Similar to "pristine" inorganic clays in water, organoclays can delaminate in organic systems (solvents, polymers): i.e. the clay layers that are now decorated with organic cations are separated from each other when they are exfoliated in said systems.

In an embodiment, the phyllosilicate clay may include crude clay or beneficiated clay. The crude clay contains gangue or non-clay material whereas the gangue material has been largely removed from the beneficiated clay. In an embodiment using crude clay, substantial cost savings may be realized because the steps for the clay beneficiation process and conversion to the sodium form are eliminated.

In some embodiments, the phyllosilicate clays include synthetic phyllosilicate clays including synthetic vermiculite, synthetic smectite, synthetic hectorite, synthetic fluorohectorite and synthetic mica. The performance of synthetic clay based organoclays may differ, either positively or negatively, from those based on naturally occurring clays. These differences may be due to chemical composition and homogeneity thereof, ion exchange capacity, location of the ion exchange sites, impurities, surface area, platelet size and distribution, and or other reasons. These clays, also, may optionally be purified if desired.

The exchangeable inorganic cations of the phyllosilicate clay may be sodium or another cation. Preferably the exchangeable cations will be sodium. In some embodiments, the exchangeable cations can be a mixture of sodium, magnesium and calcium. In one embodiment, the sodium form of the smectite clay may be used. To prepare the sodium form of one embodiment, bentonite clay may be converted to the sodium form by preparing an aqueous clay slurry and passing the slurry through a bed of cation exchange resin in the sodium form. In another embodiment, the sodium form of the smectite clay may be prepared by mixing the clay with water and a soluble sodium compound, such as sodium carbonate, sodium hydroxide, etc.

In an embodiment, the phyllosilicate clay includes smectite-type clay having a cation exchange capacity of at least 45 mMols per 100 grams of clay, 100% active clay basis, as determined by the well-known ammonium acetate method or equivalent method. In another embodiment, the phyllosilicate clay includes smectite-type clay having a cation exchange capacity of at least 75 mMols per 100 grams of clay, 100% active clay basis.

The clay may be either sheared or non-sheared forms of the above-listed smectite clays. In one embodiment, the sheared form of the smectite clay may provide improved performance as compared to non-sheared clay material. Elementis Specialties, Inc. and its predecessor have issued patents describing the shearing of smectite clay, as described in U.S. Pat. Nos. 4,695,402 and 4,742,098 which are incorporated herein by reference in their entirety.

Other Additives of Oil Based Drilling Fluid

In some embodiments, the oil based drilling fluid, according to the present invention, may be an invert emulsion drilling fluid and contain one or more additives selected from the group consisting of: brine, a fluid loss reducing additive; an emulsifier; a weighting agent, rheology modifiers and combinations thereof.

An invert emulsion drilling fluid is defined as a drilling fluid in which the continuous phase is hydrocarbon based. Oil based drilling fluids formulated with over 5% water or brine may be classified as oil based invert emulsion drilling fluids. In some embodiments, oil based invert emulsion drilling fluids may contain water or brine as the discontinuous phase in any proportion up to about 5%, 10%, 15%, 20%, 25%, 30% or 50%. Oil muds may include invert emulsion drilling fluids as well as all oil based drilling fluids using synthetic, refined or natural hydrocarbon base as the external phase.

According to some embodiments, a process for preparing invert emulsion drilling fluids (oil muds) involves using a mixing device to incorporate the individual components making up that fluid. In some embodiments, primary and secondary emulsifiers and/or wetting agents (surfactant mix) are added to the base oil (continuous phase) under moderate agitation. The water phase, typically a brine, may be added to the base oil/surfactant mix along with alkalinity control agents and acid gas scavengers. In some embodiments, rheological additives as well as fluid loss control materials, weighting agents and corrosion inhibition chemicals may also be included. The agitation may then be continued to ensure dispersion of each ingredient and homogenize the resulting fluidized mixture.

Base Oil/Continuous Phase

In some embodiments, the invert emulsion drilling fluid may be selected from diesel oil, mineral oil, synthetic oil, vegetable oil, fish oil, paraffinics, and/or ester-based oils can all be used as single components or as blends.

Brine Content

In some embodiments, water in the form of brine is often used in forming the internal phase of the oil based drilling fluids. According to some embodiments, water can be defined as an aqueous solution which can contain from about 10 to 350,000 parts-per-million of metal salts such as lithium, sodium, potassium, magnesium, cesium, or calcium salts. In some embodiments, brines used to form the internal phase of a drilling fluid according to the present invention can also contain about 5% to about 35% by weight calcium chloride and may contain various amounts of other dissolved salts such as sodium bicarbonate, sodium sulfate, sodium acetate, sodium borate, potassium chloride, sodium chloride or formates (such as sodium, calcium, or cesium). In some embodiments, glycols or glycerin can be used in place of or in addition to brines.

In some embodiments, the ratio of water (brine) to oil in the oil based drilling fluid, according to the present invention, may provide as high a brine content as possible while still maintaining a stable emulsion. In some embodiments, suitable oil/brine ratios may be in the range of about 97:3 to about 50:50. In some embodiments, suitable oil/brine ratios may be in the range of about 90:10 to about 60:40, or about 80:20 to about 70:30. In some embodiments, the preferred oil/brine ratio may depend upon the particular oil and mud weight. According to some embodiments, the water content of a drilling fluid prepared according to the teachings of the invention may have an aqueous (water) content of about 0 to 50 volume percent, Emulsifiers According to some embodiments, an emulsifier can also be added to the oil based drilling fluid in order to form a more stable emulsion. The emulsifier may include organic acids, including but not limited to the monocarboxyl alkanoic, alkenoic, or alkynoic fatty acids containing from 3 to 20 carbon atoms, and mixtures thereof. Examples of this group of acids include stearic, oleic, caproic, capric and butyric acids. In some embodiments, adipic acid, a member of the aliphatic dicarboxylic acids, can also be used. According to some embodiments, suitable surfactants or emulsifiers include fatty acid calcium salts and lecithin. In other embodiments, suitable surfactants or emulsifiers include oxidized tall oil, polyaminated fatty acids, and partial amides of fatty acids.

In some embodiments, heterocyclic additives such as imidazoline compounds may be used as emulsifiers and/or wetting agents in the oil based drilling fluid. In other embodiments, alkylpyridines may be used to as emulsifiers and/or wetting agents in the oil based drilling fluid.

Industrially obtainable amine compounds for use as emulsifiers may be derived from the epoxidation of olefinically unsaturated hydrocarbon compounds with subsequent introduction of the N function by addition to the epoxide group. The reaction of the epoxidized intermediate components with primary or secondary amines to form the corresponding alkanolamines may be of significance in this regard. In some embodiments, polyamines, particularly lower polyamines of the corresponding alkylenediamine type, are also suitable for opening of the epoxide ring.

Another class of the oleophilic amine compounds that may be suitable as emulsifiers are aminoamides derived from preferably long-chain carboxylic acids and polyfunctional, particularly lower, amines of the above-mentioned type. In some embodiments, at least one of the amino functions is not bound in amide form, but remains intact as a potentially salt-forming basic amino group. The basic amino groups, where they are formed as secondary or tertiary amino groups, may contain hydroxyalkyl substituents and, in particular, lower hydroxyalkyl substituents containing up to five and in some embodiments up to three carbon atoms in addition to the oleophilic part of the molecule.

According to some embodiments, suitable N-basic starting components for the preparation of such adducts containing long-chain oleophilic molecule constituents may include but are not limited to monoethanolamine or diethanolamine.

Weight Agents

In some embodiments, weighting materials are also used to weight the oil based drilling fluid to a desired density. In some embodiments, the oil based drilling fluid is weighted to a density of about 8 to about 18 pounds per gallon and greater. Suitable weighting materials may include barite, ilmenite, calcium carbonate, iron oxide and lead sulfide. In some embodiments, commercially available barite is used as a weighting material.

Fluid Loss Control

In some embodiments, fluid loss control materials are added to the oil based drilling fluid to control the seepage of drilling fluid into the formation. In some embodiments, fluid loss control materials are lignite-based or asphalt-based. Suitable fluid loss control materials may include amine treated lignite, gilsonite and/or elastomers such as styrene butadiene.

As shown above, a skilled artisan will readily recognize that additional additives such as wetting agents, viscosifiers, fluid loss control agents, rheology modifiers, anti-settling agents and other agents can be used with a composition according to the present invention.

Method of Use

The present application provides for embodiments of a method for maintaining viscosity of an oil-based drilling fluid over a temperature range of about 120° F. to about 40° F. In some embodiments, an organoclay drilling fluid additive is added to a drilling fluid. The organoclay drilling fluid additive comprises a phyllosilicate clay and a quaternary ammonium ion. Various embodiments of the organoclay drilling fluid additive are described above herein and one of skill in the art will understand such embodiments may be used in the methods described herein. In one such embodiment, the organoclay drilling fluid additive is added to a base oil to form an oil based drilling fluid. In some embodiments, the drilling fluid additive may be added to a drilling fluid in combination with other additives described herein above.

In one embodiment of the foregoing method of using the organoclay drilling fluid additive, the method further includes the step of placing the drilling fluid in a subterranean formation via a wellbore penetrating the subterranean formation.

The properties imparted by the organoclay drilling fluid additive to the oil based drilling fluid may be characterized by several rheological or hydraulic aspects, i.e., ECD, high shear rate viscosity, low shear rate viscosity, plastic viscosity, regulating property viscosity and yield point, of a drilling fluid. The rheological aspects may be determined using a Fann viscometer as per standard procedures found in API RP13B-2 "Standard Procedures for Field Testing Oil-based Drilling Fluids". Viscosity readings can be measured at 600 rpm, 300 rpm, 200 rpm, 100 rpm, 6 rpm and 3 rpm. ECD can be determined by: standard hydraulics calculations found in API RP13D "Rheology and Hydraulics of Oil-well Drilling Fluids." For the purposes of this invention high shear rate viscosity ("HSR") corresponds to the viscosity measured at 600 rpm as per API RP13B-2 procedures. For the purposes of this invention, low shear rate viscosity ("LSR") corresponds to the viscosity measured at 6 rpm as per API RP 13B-2 procedures. Plastic viscosity ("PV") corresponds to the 600 rpm reading minus the 300 rpm reading. Yield Point ("YP") corresponds to the 300 rpm reading minus plastic viscosity.

In one embodiment, the organoclay drilling fluid additive imparts a first high shear viscosity to the oil-based drilling fluid at temperatures of 40° F. or less, measured at 600 rpm using a FANN viscometer at 40° F. and imparts a second high shear viscosity to the oil-based drilling fluid at temperatures greater than or equal to 120° F., measured at 600 rpm using a FANN viscometer at 120° F. In one such embodiment, the difference between the first high shear viscosity and the second high shear viscosity is less than about 90%, when the first high shear viscosity is measured at 600 rpm using a FANN viscometer at 40° F. and the second high shear viscosity is measured at 600 rpm using a FANN viscometer at 120° F. In another such embodiment, the difference between the first high shear viscosity and the second high shear viscosity is less than about 70%, when the first high shear viscosity is measured at 600 rpm using a FANN viscometer at 40° F. and the second high shear viscosity is measured at 600 rpm using a FANN viscometer at 120° F. In yet another such embodiment, the difference between the first high shear viscosity and the second high shear viscosity is less than about 50%, when the first high shear viscosity is measured at 600 rpm using a FANN viscometer at 40° F. and the second high shear viscosity is measured at 600 rpm using a FANN viscometer at 120° F.

In still another embodiment, the organoclay drilling fluid additive further imparts a first low shear viscosity to the oil-based drilling fluid at temperatures of 40° F. or less, measured at 6 rpm using a FANN viscometer at 40° F. and imparts a second low shear viscosity to the oil-based drilling fluid at temperatures greater than or equal to 120° F., measured at 6 rpm using a FANN viscometer at 120° F. In such an embodiment, the difference between the first low shear viscosity and the second low shear viscosity is less than about 50%, when the first low shear viscosity is measured at 6 rpm using a FANN viscometer at 40° F. and the second low shear viscosity is measured at 6 rpm using a FANN viscometer at 120° F. In another such embodiment, the difference between the first low shear viscosity and the second low shear viscosity is less than about 25%, when the first low shear viscosity is measured at 6 rpm using a FANN viscometer at 40° F. and the second low shear viscosity is measured at 6 rpm using a FANN viscometer at 120° F. In still another such embodiment, the difference between the first low shear viscosity and the second low shear viscosity is less than about 10%, when the first low shear viscosity is measured at 6 rpm using a FANN viscometer at 40° F. and the second low shear viscosity is measured at 6 rpm using a FANN viscometer at 120° F.

In some embodiments, the addition of the organoclay drilling fluid additive to an oil based drilling fluid results in difference in ECD as temperature is varied over a range of about 120° F. to about 40° F. For the purposes of this invention, a difference ECD may include a decrease or increase in ECD over such temperature variation. In one embodiment, the increase in ECD may include: up to 0.5%; up to 1%; up to 2%, up to 3%, or up to 4%. In one embodiment, the decrease in ECD may include: up to 0.5%; up to 1%; up to 2%, up to 3%, or up to 4%. In one embodiment, the increase in ECD may range from 0.5% up to 4%. In another embodiment, the increase in ECD may range from 0.5% up to 5%.

In some embodiments, a drilling fluid according to the present invention may have a lower viscosity at 40° F. than conventional muds formulated with sufficient conventional organoclay to provide suspension at bottom hole temperatures. When used in drilling operations, drilling fluids according to the present invention may allow the use of a lower pumping power to pump drilling muds through long distances, thereby reducing down-hole pressures.

Consequently, in some embodiments, whole mud loss, fracturing and damage of the formation are all minimized. In some embodiments, drilling fluids according to the present invention may maintain the suspension characteristics typical of higher levels of conventional organoclays at higher temperatures. Such suspension characteristics may reduce the tendency of the mud to sag. Sag may include the migration of weight material, resulting in a higher density mud at a lower fluid fraction and a lower density mud at a higher fluid fraction. A reduction of sag may be valuable in both deep water drilling as well as conventional (non deep water) drilling. The present invention may be particularly useful in deep water drilling when the mud is cooled in the riser. A mud using a drilling fluid additive according to the present invention will maintain a reduced viscosity increase in the riser when compared to drilling fluids containing conventional rheological additives.

For the purposes of this application, the term "about" means plus or minus 10%.

EXAMPLES

The following examples further describe and demonstrate illustrative embodiments within the scope of the present invention. The examples are given solely for illustration and are not to be construed as limitations of this invention as many variations are possible without departing from the spirit and scope thereof.

Example 1

A sodium bentonite clay ore from Wyoming was dispersed in water at about 5 wt. % clay solids. The crude clay slurry was mixed overnight at ambient temperature and then centrifuged to yield a beneficiated clay slurry. Roughly 30 wt % of the crude bentonite clay was discarded during the beneficiation process, and the resulting purified clay slurry was ion exchanged into the sodium form prior to shearing with a Manton Gaulin homogenizer. The beneficiated and sheared clay had a cation exchange capacity of about 102 milliequivalents (meq.) per 100 grams clay as determined by the methylene blue method. The clay slurry was diluted with water to yield 2% clay solids at reaction and then heated to 65° C. prior to reaction with a certain cation exchange equivalent of dimethyl dicoco ammonium chloride, per 100 grams of clay (dry basis). After reaction, the organoclay was filtered, dried in a forced air oven set at 45° C. and milled to a fine powder. The sample was labeled 3298-88-2. The neat shear strength of dimethyl dicoco ammonium-chloride was measured, as described herein, as 4336.16 pounds/100 ft$^2$.

Example 2

An organoclay composition was prepared following the procedure described for Example 1 using dimethyl didecyl ammonium chloride as the quaternary ammonium salt. The sample was labeled 3298-88-3. The neat shear strength of dimethyl didecyl ammonium chloride was measured, as described herein, as 3705.86 pounds/100 ft².

Testing of Organoclay Compositions

Mud compositions were prepared for evaluation based on Formulation 1 that contained a synthetic IAO as a base oil and were weighted to 12 ppg with an oil:brine ratio of 70:30.

TABLE 1

Formulation 1

| Raw Materials | Charge (g) | |
|---|---|---|
| Base Oil: IAO | 179 | |
| Primary Emulsifier: | 10 | MultiMixer Mix 2 min. |
| Tested Additive | (See Tables) | MultiMixer Mix 5 min. |
| 25% CaCl₂ Brine | 77 | MultiMixer Mix 4 min. |
| Lime | 10 | MultiMixer Mix 4 min. |
| Weighting Agent: Barite | 222.1 | MultiMixer Mix 30 min. |

The mud compositions were dynamically aged using a roller oven for 16 hours at 150° F. After the muds were water cooled for one hour, they were mixed on a Hamilton beach MultiMixer for 10 minutes. After dynamically aged, the muds were then statically aged for 16 hours at 40° F. In Example 3 and Comparative Example 6, the muds were dynamically aged at 250° F., 300° F. and/or 350° F. after statically aging at 40° F. Mud viscosity measurements were measured using the Fann OFI-900 at 120° F. using test procedures API RP 13B. For 40° F. static aging, the viscosity test was made at 40° F.

Example 3

The organoclay drilling fluid additive of Example 1 was added to Formulation 1 and tested as discussed above. The rheological profile is shown below in Table 2.

TABLE 2

| | Additive 3298-88-2 Concentration | | | | | |
|---|---|---|---|---|---|---|
| OFI 900 Visc. | 7 ppb Initial 120° F. Test | 7 ppb HR 150° F. 120° F. Test | 7 ppb SA 40° F. 40° F. Test | 7 ppb HR 250° F. 120° F. Test | 7 ppb HR 300° F. 120° F. Test | 7 ppb HR 350° F. 120° F. Test |
| 600 RPM Reading | 77 | 85 | 155 | 83 | 88 | 113 |
| 300 RPM Reading | 49 | 54 | 95 | 54 | 58 | 71 |
| 200 RPM Reading | 38 | 40 | 72 | 43 | 46 | 55 |
| 100 RPM Reading | 26 | 26 | 47 | 30 | 31 | 36 |
| 6 RPM Reading | 11 | 10 | 16 | 14 | 14 | 12 |
| 3 RPM Reading | 10 | 9 | 14 | 13 | 13 | 11 |
| Apparent Visc., cPs | 39 | 43 | 78 | 42 | 44 | 57 |
| Plastic Visc., cPs | 28 | 31 | 60 | 29 | 30 | 42 |
| Yield Point, Lbs/100 ft² | 21 | 23 | 35 | 25 | 28 | 29 |
| Tau 0 (LSR) | 9 | 8 | 12 | 12 | 12 | 10 |
| Electrical Stability | 920 | 1203 | 1527 | 1281 | 1077 | 1140 |
| 10 Sec Gel | 12 | 10 | 19 | 16 | 17 | 14 |
| 10 Min Gel | | 15 | 27 | 30 | 30 | 25 |
| ECD | | 12.45 | 12.71 | | | |

Example 4

The organoclay drilling fluid additive of Example 2 was added to Formulation 1 and tested as discussed above. The rheological profile is shown below in Table 3.

TABLE 3

| Test Conditions | 9 ppb HR 150° F. 120° F. Test | 9 ppb SA 40° F. 40° F. Test |
|---|---|---|
| OFI 900 Visc. | | |
| 600 RPM Reading | 97 | 204 |
| 300 RPM Reading | 63 | 123 |
| 200 RPM Reading | 49 | 93 |
| 100 RPM Reading | 34 | 59 |
| 6 RPM Reading | 12 | 18 |
| 3 RPM Reading | 11 | 15 |
| ECD | 12.54 | 12.88 |
| Apparent Visc., cPs | 49 | 102 |
| Plastic Visc., cPs | 34 | 81 |
| Yield Point, Lbs/100 ft² | 29 | 42 |
| Electrical Stability | 1016 | 1070 |
| 10 Sec Gel | 11 | 16 |
| 10 Min Gel | 19 | 27 |

Comparative Example 5

A comparative organoclay was prepared as described for Example 1 using dimethyl dehydrogenated tallow ammonium chloride as the quaternary ammonium salt-comparative example 5. The neat shear strength of dimethyl dehydrogenated tallow ammonium chloride was measured, as described herein, as 2780767.44 pounds/100 ft².

Comparative Example 6

The organoclay from Example 5 was prepared using Formulation 1 and tested as discussed above. The rheological profile is shown below in Table 4.

TABLE 4

| | Additive Comparative Example 5 Concentration | | | | | |
|---|---|---|---|---|---|---|
| OFI 900 Visc. | 7 ppb Initial 120° F. Test | 7 ppb HR 150° F. 120° F. Test | 7 ppb SA 40° F. 40° F. Test | 7 ppb HR 250° F. 120° F. Test | 7 ppb HR 300° F. 120° F. Test | 7 ppb HR 350° F. 120° F. Test |
| 600 RPM Reading | 70 | 81 | 205 | 95 | 74 | 85 |
| 300 RPM Reading | 47 | 54 | 157 | 52 | 50 | 50 |
| 200 RPM Reading | 38 | 41 | 139 | 41 | 38 | 36 |
| 100 RPM Reading | 27 | 28 | 115 | 28 | 26 | 21 |
| 6 RPM Reading | 13 | 12 | 72 | 14 | 13 | 5 |
| 3 RPM Reading | 13 | 12 | 70 | 13 | 12 | 4 |
| Apparent Visc., cPs | 35 | 41 | 103 | 48 | 37 | 43 |
| Plastic Visc., cPs | 23 | 27 | 48 | 43 | 24 | 35 |
| Yield Point, Lbs/100 ft$^2$ | 24 | 27 | 109 | 9 | 26 | 15 |
| Tau 0 (LSR) | 13 | 12 | 68 | 12 | 11 | 3 |
| Electrical Stability | 969 | 1168 | 1531 | 1218 | 861 | 1003 |
| 10 Sec Gel | 14 | 12 | 72 | 13 | 14 | 5 |
| 10 Min Gel | | 16 | 67 | 17 | 19 | 8 |
| ECD | | | 12.5 | 13.92 | | |

A comparison of the data in Tables 2 and 3 to the data in Table 4, shows that drilling muds containing quaternary ammonium cations, of Examples 1 and 2 provide for a low viscosity at 40° F. with a 6 RPM of 16 and 18, respectively, compared to drilling mud containing Comparative Example 5, where the 40° F. 6 RPM viscosity was 72.

A further comparison of the data in Tables 2 and 3, to the data in Table 4, shows that the drilling muds containing quaternary ammonium cations, of Examples 1 and 2 provide for a more constant 600 RPM viscosity between 120° F. and 40° F., a change of 100% and 85%, respectively, compared to the drilling mud containing Comparative Example 5 which showed a change of 192%.

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. An oil-based drilling fluid comprising:
   an invert emulsion drilling fluid;
   an organoclay drilling fluid additive comprising a phyllosilicate clay selected from the group consisting of montmorillonite, bentonite, hectorite, and combinations thereof, and a quaternary ammonium ion, wherein the quaternary ammonium ion has a corresponding quaternary ammonium salt having a neat shear strength value of from 3705 lb/100 ft$^2$ to 4336 lb/100 ft$^2$ and
   one or more additives selected from the group consisting of: a fluid loss reducing additive; an emulsifier; a weighting agent, brine, rheology modifiers and combinations thereof, and
   wherein the oil-based drilling fluid is substantially free of a polyamide drilling fluid additive.

2. The oil-based drilling fluid of claim 1, wherein the invert emulsion drilling fluid has an external phase selected from the group consisting of: diesel oil, mineral oil, synthetic oil, vegetable oil, fish oil, paraffinics, ester-based oils and combinations thereof.

3. The oil-based drilling fluid of claim 1, wherein the organoclay drilling fluid additive has a concentration ranging from 2 ppb to about 15 ppb.

4. The oil-based drilling fluid of claim 1, wherein the quaternary ammonium ion is selected from dimethyl dicoco ammonium salt; dimethyl dicoco ammonium chloride; dimethyl didecyl ammonium salt; dimethyl didecyl ammonium chloride and combinations thereof.

* * * * *